United States Patent
Lim et al.

(10) Patent No.: US 8,711,806 B2
(45) Date of Patent: Apr. 29, 2014

(54) COMMUNICATION SYSTEM AND DATA TRANSMISSION METHOD THEREOF

(75) Inventors: Chae Gwon Lim, Seoul (KR); Sung Ho Choi, Suwon-si (KR); Hyoung Kyu Lim, Seoul (KR); Tae Sun Yeoum, Seoul (KR); Eun Hui Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 12/608,658

(22) Filed: Oct. 29, 2009

(65) Prior Publication Data

US 2010/0111041 A1 May 6, 2010

(30) Foreign Application Priority Data

Oct. 30, 2008 (KR) ................ 10-2008-0106915

(51) Int. Cl.
*H04W 4/00* (2009.01)
(52) U.S. Cl.
USPC ............ 370/331; 370/338; 370/349; 370/351
(58) Field of Classification Search
USPC ................ 370/328, 330, 331, 338, 349, 351; 455/436
See application file for complete search history.

(56) References Cited

U.S. PATENT DOCUMENTS

| | | | | |
|---|---|---|---|---|
| 5,896,373 A | * | 4/1999 | Mitts et al. | 370/331 |
| 2006/0092880 A1 | * | 5/2006 | Nounin et al. | 370/331 |
| 2008/0253334 A1 | * | 10/2008 | Torsner et al. | 370/331 |
| 2008/0310367 A1 | * | 12/2008 | Meylan | 370/331 |
| 2009/0061876 A1 | * | 3/2009 | Ho et al. | 455/436 |
| 2009/0135783 A1 | * | 5/2009 | Khalil et al. | 370/331 |
| 2009/0290556 A1 | * | 11/2009 | Taaghol | 370/331 |

* cited by examiner

*Primary Examiner* — Brian D Nguyen
*Assistant Examiner* — Toan Nguyen
(74) *Attorney, Agent, or Firm* — Jefferson IP Law, LLP

(57) ABSTRACT

A communication system and data transmission method thereof are provided. The method includes adding an end marker to the end of source data and transmitting the source data and the end marker for a Packet data network GateWay (PGW) to a source evolved Node B (eNB) if a handover is carried out from the source eNB to a target eNB while the PGW is transmitting the source data to the source eNB, forwarding the source data and the end marker from the source eNB to the target eNB, transmitting target data immediately following the source data from the PGW to the target eNB, and transmitting the source data and the target data, which is classified into the source data by the end marker and immediately follows the end of the source data, from the target eNB to user equipment.

14 Claims, 6 Drawing Sheets

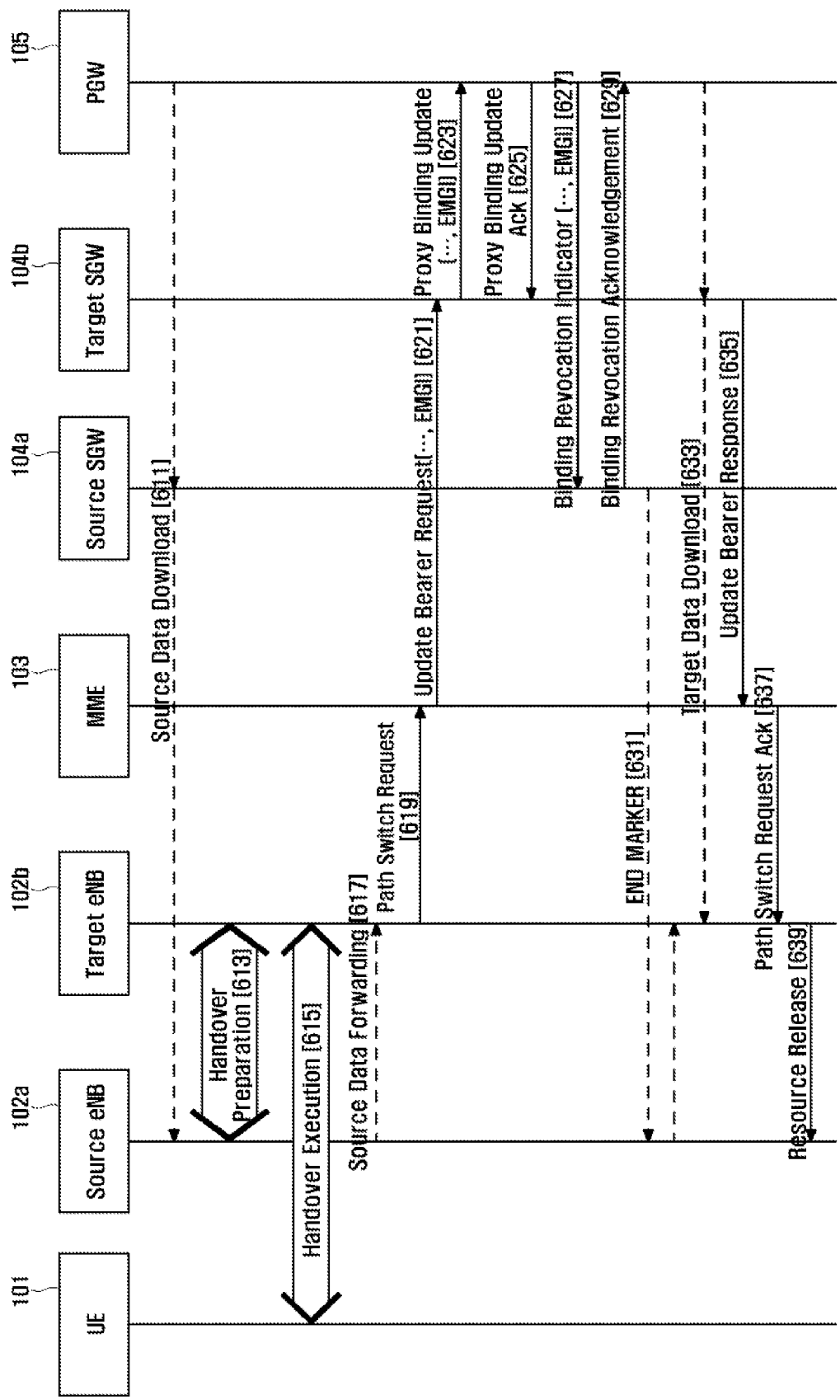

US 8,711,806 B2

COMMUNICATION SYSTEM AND DATA TRANSMISSION METHOD THEREOF

PRIORITY

This application claims the benefit under 35 U.S.C. §119(a) of a Korean patent application filed in the Korean Intellectual Property Office on Oct. 30, 2008 and assigned Serial No. 10-2008-0106915, the entire disclosure of which is hereby incorporated by reference.

BACKGROUND OF THE INVENTION

1. Field of the Invention

The present invention relates to a communication system and data transmission method thereof. More particularly, the present invention relates to a communication system and data transmission method thereof that efficiently transmits data to user equipment when a handover is performed between evolved Node Bs (eNBs).

2. Description of the Related Art

In general, Universal Mobile Telecommunication Systems (UMTS) refer to a third ($3^{rd}$) generation communication system that is based on a Global System for Mobile communications (GSM) and General Packet Radio Services (GPRS), and uses Wideband Code Division Multiple Access (WCDMA). A 3rd Generation Partnership Project (3GPP) for standardizing the UMTS has proposed an Evolved Packet System (EPS), such as a Long Term Evolution (LTE) system, where the EPS is a next generation communication system of the UMTS. The LTE system refers to a technology for implementing fast packet based communication.

In the next generation communication system, while a source eNB downloads source data, a handover of user equipment may be performed from the source eNB to a target eNB. In that case, the source eNB forwards the source data to the target eNB. The target eNB downloads the source data and target data following the source data.

However, the target eNB has difficulty in determining the transmission order between the source data and the target data. That is, the target eNB cannot precisely identify a time point to transmit target data to user equipment.

Therefore, a need exists for a communication system and data transmission method for determining a transmission order between source data and target data, and for identifying a time point to transmit the target data.

SUMMARY OF THE INVENTION

An aspect of the present invention is to address at least the above-mentioned problems and/or disadvantages and to provide at least the advantages described below. Accordingly, an aspect of the present invention is to provide a communication system and data transmission method thereof that efficiently transmits data to user equipment when a handover is performed between evolved Node Bs (eNBs).

In accordance with an aspect of the present invention, a data transmission method is provided. The method includes adding an end marker to the end of source data and transmitting the source data and the end marker from a Packet data network GateWay (PGW) to a source evolved Node B (eNB), if a handover is carried out from the source eNB to a target eNB while the PGW is transmitting the source data to the source eNB, forwarding the source data and the end marker from the source eNB to the target eNB, transmitting target data immediately following the source data from the PGW to the target eNB, and transmitting the source data and the target data, which is classified into the source data by the end marker and immediately follows the end of the source data, from the target eNB to user equipment.

The transmitting of the source data and the end marker may be performed if a source Serving GateWay (SGW) differs from a target SGW, in which the source SGW transmits the source data from the PGW to the source eNB and the target SGW transmits the target data to the target eNB.

In accordance with another aspect of the present invention, a data transmission method is provided. The method includes generating an end marker, adding the end marker to the end of source data, and transmitting the source data and the end marker from a Packet data network GateWay (PGW) to a source evolved Node B (eNB) if a handover is carried out from the source eNB to a target eNB while the PGW is transmitting the source data to the source eNB via a source Serving GateWay (SGW), forwarding the source data and the end marker from the source eNB to the target eNB, transmitting target data immediately following the source data from the PGW to the target eNB via a target SGW, and transmitting the source data and the target data, which is classified into the source data by the end marker and immediately follows the end of the source data, from the target eNB to user equipment.

The forwarding of the source data and the end marker from the source eNB to the target eNB may include transmitting the source data and the end marker from the source eNB to the source SGW, transmitting the source data and the end marker from the source SGW to the target SGW, and transmitting the source data and the end marker from the target SGW to the target eNB.

In accordance with still another aspect of the present invention, a data transmission method is provided. The method includes commanding, by a Packet data network GateWay (PGW), a source Serving GateWay (SGW) to generate an end marker, if a handover is carried out from a source evolved Node B (eNB) to a target eNB while the PGW is transmitting the source data to the source eNB via the source SGW, generating the end marker, adding the end marker to the end of the source data, and transmitting the source data and the end marker from the source SGW to the source eNB, forwarding the source data and the end marker from the source eNB to the target eNB, transmitting target data immediately following the source data from the PGW to the target eNB via a target SGW; and transmitting the source data and the target data, which is classified into the source data by the end marker and immediately follows the end of the source data, from the target eNB to user equipment.

In accordance with yet another aspect of the present invention, a communication system is provided. The system includes a source evolved Node B (eNB), connected to user equipment, for downloading source data, a target eNB, connected to the user equipment by carrying out a handover, for downloading target data that immediately follows the source data when the handover is carried out, and a Packet data network GateWay (PGW) for adding an end marker to the end of the source data, for transmitting the source data and the end marker to the source eNB, and for transmitting the target data to the target eNB, when the handover is carried out while the source data is transmitting to the source eNB, wherein the source eNB forwards the source data and the end marker to the target eNB when the handover is performed, and the target eNB receives the source data and the target data and transmits the source data and the target data, which is classified into the source data by the end marker and immediately follows the end of the source data, to the user equipment.

The communication system may further include a source Serving GateWay (SGW) via which the PGW transmits the source data to the source eNB; and a target SGW via which the PGW transmits the target data to the target eNB, wherein the PGW transmits the end marker to the source eNB if the source SGW and the target SGW differ from each other.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is a signal flowchart of a data transmission method according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an exemplary embodiment of the present invention, the term 'source' as a prefix will be used for a configuration system that is currently connected to user equipment that may perform a handover. Similarly, the term 'target' as a prefix will be used for a configuration system that will be connected to user equipment through a handover.

The term 'source data' denotes a portion of original data provided in a communication system. That is, the 'source data' denotes data that is provided to configuration elements with the prefix 'source' before a handover is carried out in the communication system. Before a handover is performed, at least a portion of the source data may be provided to user equipment. After the handover is carried out, the remaining portion of the source data is forwarded to configuration elements with the prefix 'target'.

The term 'target data' denotes a portion of the original data other than the source data, where the target data immediately follows the source data. The 'target data' refers to data that provides configuration elements with the prefix 'target' after a handover is carried out.

The term 'end marker' denotes a marker that indicates an end of the 'source data'. That is, the end marker denotes a boundary between the source data and the target data or a transmission time point of the target data.

Figure 1:
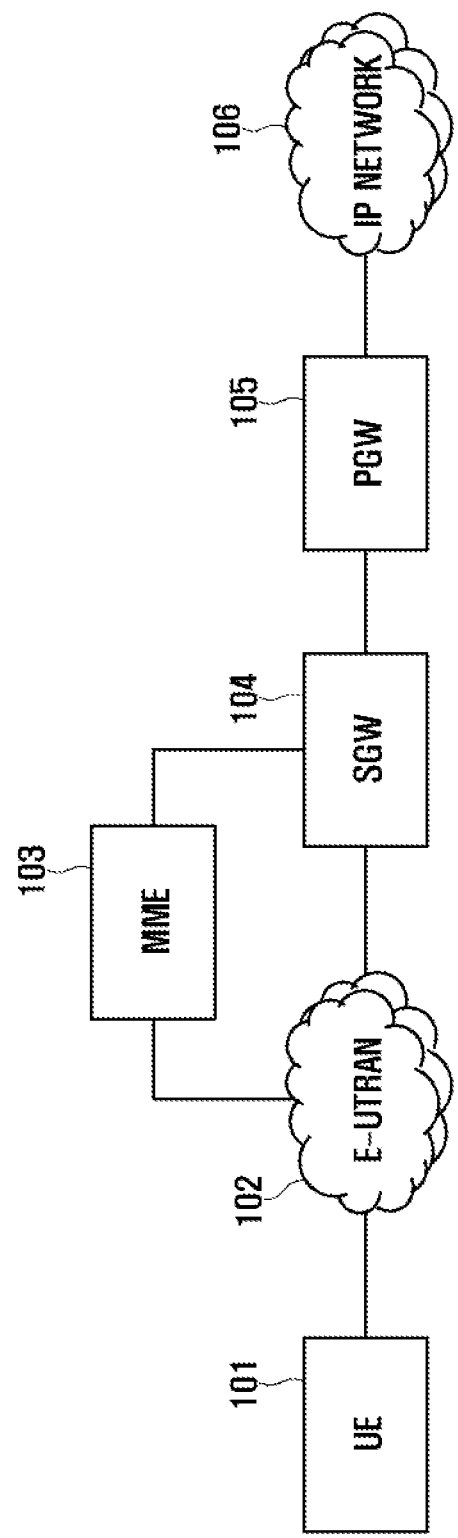
FIG. 1 is a schematic block diagram illustrating a communication system according to an exemplary embodiment of the present invention.

FIG. 1 is a schematic block diagram illustrating a communication system according to an exemplary embodiment of the present invention. In an exemplary implementation, it is assumed that the communication system is a Long Term Evolution (LTE) system.

Referring to FIG. 1, the communication system includes User Equipment (UE) 101, an Evolved Universal Mobile Telecommunication System (UMTS) Radio Access Network (E-UTRAN) 102, a Mobility Management Entity (MME) 103, a Serving GateWay (SGW) 104 a Packet data network GateWay (PGW) 105 and an Internet Protocol (IP) Network 106.

The UE 101 may be fixed or mobile.

The E-UTRAN 102 may be connected to the UE 101 via a wireless channel. The E-UTRAN 102 may be composed of a plurality of cells and includes a plurality of evolved Node Bs (eNBs) that control the cells, respectively. The eNBs are connected to each other via an X2 interface. The eNBs perform Radio Resource Management (RRM), such as Radio Bearer Control (RBC), Radio Admission Control (RAC), Connection Mobility Control (CMC), Dynamic Resource Allocation (DRA), and the like, toward the user equipment 101. The eNBs also perform IP header compression and data encryption/decryption, data routing, scheduling and transmitting paged messages, scheduling and transmitting broadcast information, measurement for mobility and scheduling, and setting measurement reports. That is, the eNBs download data and then transmit the downloaded data to the UE 101.

The E-UTRAN 102 includes a source eNB and a target eNB. The source eNB refers to an eNB that is currently connected to the UE 101. The target eNB refers to an eNB to which the UE 101 will be connected through a handover. That is, when a handover is carried out from the source eNB to a target eNB, the UE 101 is disconnected with the source eNB and then connected to the target eNB. When the UE 101 is connected to the source eNB, the source eNB downloads source data. When a handover is carried out from the source eNB to the target eNB, the source eNB forwards the source data to the target eNB. The target eNB downloads the target data that follows the source data. After the target eNB transmits the source data to the UE 101, the target eNB also transmits the target data following the source data thereto.

The Mobility Management Entity (MME) 103 may be connected to the E-UTRAN 102 via a wireless channel. The MME 103 may also be connected to the E-UTRAN 102 via an S1 interface. The MME 103 performs paged message distribution towards the eNBs, integrity protection and ciphering of Non-Access Stratum (NAS) signaling, idle state mobility control, Bearer Control, and the like. An operation of the MME 103 will be explained in more detail below with reference to FIG. 2.

The SGW 104 may be connected to the E-UTRAN 102 and the MME 103 via wireless channels, respectively. The SGW 104 may be connected to the E-UTRAN 102 via an S1 interface. In an exemplary implementation, the communication system may include a plurality of SGWs. In that case, the SGWs are connected to the eBNs, respectively. The SGW 104 controls the mobility of the UE 101.

The SGW 104 may be a source SGW or a target SGW. A source SGW refers to a SGW connected to a source eNB. A target SGW refers to a SGW connected to a target eNB. The source SGW and target SGW may be identical to each other or different from each other. That is, when a handover is carried out from a source eNB to a target eNB, the SGW 104 connected to the UE 101 may be altered.

The PGW 105 may be connected to the SGW 104 via a wireless channel. The PGW 105 may also be connected to the IP network 106. The PGW 105 performs IP address allocation to the UE 101, data filtering function, and the like. That is, the PGW 105 transmits data from the IP network 106 to the UE 101 via the SGW 104 and the E-UTRAN 102.

Figure 2:
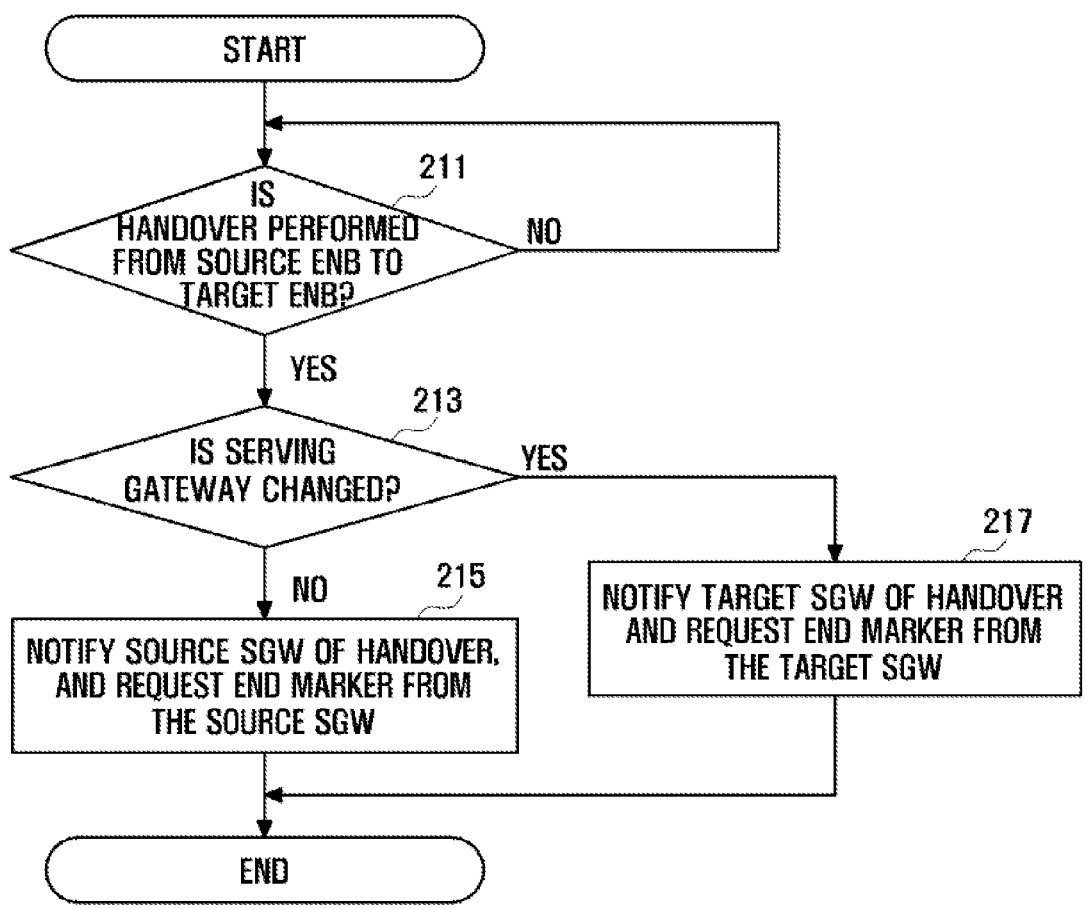
FIG. 2 is a flowchart of a method for operating a Mobility Management Entity (MME) in a communication system according to an exemplary embodiment of the present invention.

FIG. 2 is a flowchart of a method for operating a Mobility Management Entity (MME) in a communication system according to an exemplary embodiment of the present invention.

Referring to FIG. 2, when a handover of a UE 101 is carried out from a source eNB of the E-UTRAN 102 from a target eNB, the MME 103 detects whether a handover is performed in step 211. If the MME 103 ascertains that a handover of the UE 101 is carried out from a source eNB of the E-UTRAN 102 from a target eNB in step 211, the MME 103 determines whether the SGW 104 is changed in step 213. That is, the MME 103 determines whether the source SGW is equal to the target SGW. If the MME 103 ascertains that the source SGW and the target SGW are equal to each other in step 213, the MME 103 notifies the source SGW of a handover and requests an end marker therefrom in step 215. On the contrary, if the MME 103 ascertains that the source SGW and the target SGW are not equal to each other in step 213, the MME 103 notifies the target SGW of a handover and requests an end marker therefrom in step 217.

If the source SGW is equal to the target SGW when a handover of the UE 101 is carried out, the SGW 104 switches its data transmission path from the source eNB to a target eNB. The SGW 104 then adds an end marker to the end of the source data and transmits the source data to the target eNB via the source eNB. On the contrary, if the source SGW differs from the target SGW when a handover of the UE 101 is carried out, the PGW 105 switches its data transmission path from the source SGW and the source eNB to a target SGW and a target eNB. The PGW 105 then adds an end marker to the end of the source data and transmits the source data to the target eNB via the source eNB.

The target eNB transmits the source data to the UE 101. The target eNB also transmits the target data, classified into the source data by the end marker, to the UE 101. That is, the target eNB transmits the target data to the UE 101 immediately after transmitting the source data, where the target data immediately follows the end of the source data.

Figure 3:
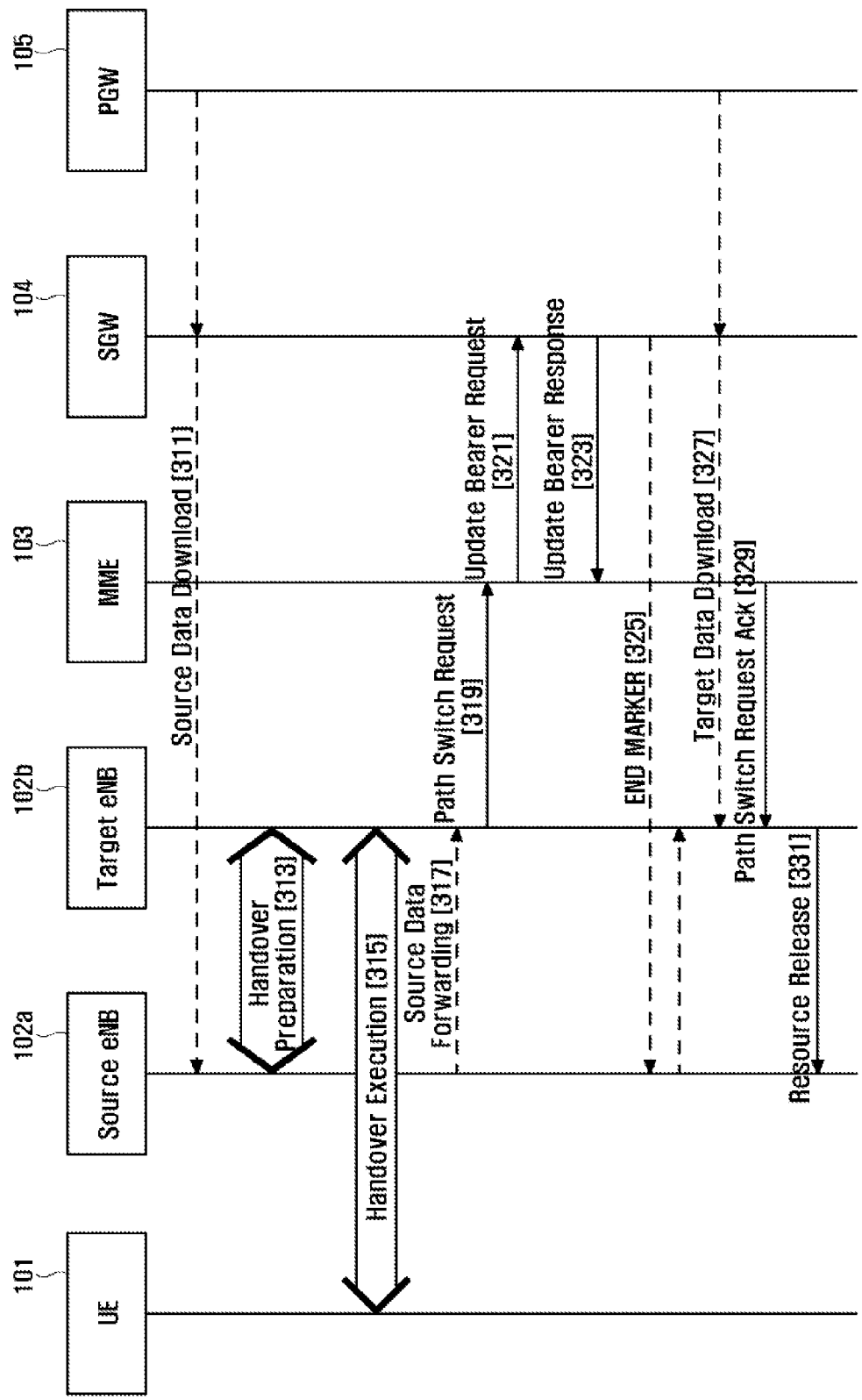
FIG. 3 is a signal flowchart of a data transmission method according to an exemplary embodiment of the present invention.

FIG. 3 is a signal flowchart of a data transmission method according to an exemplary embodiment of the present invention. In an exemplary implementation, it is assumed that a source SGW is identical to a target SGW. It is also assumed that a handover between a source eNB and a target eNB is performed via an X2 interface. That is, communication may be directly or indirectly performed between the source eNB and the target eNB. It is also assumed that a PGW is communicated with the source SGW and the target SGW via a General Packet Radio Service (GPRS) Tunneling Protocol (GTP).

Referring to FIG. 3, a data transmission procedure starts as a source eNB 102a downloads source data via a source data transmission path in step 311. The source data transmission path connects the PGW 105, a SGW 104 and the source eNB 102a. The source eNB 102a may transmit a portion of the source data to the UE 101. When a handover of the UE 101 is needed during the download of the source data, the source eNB 102a and the target eNB 102b prepare a handover in step 313. The UE 101 then performs the handover from the source eNB 102a to the target eNB 102b in step 315. The source eNB 102a forwards the source data to the target eNB 102b in step 317. In that case, the target eNB 102b transmits the source data to the UE 101.

The target eNB 102b then transmits a path switch request message to an MME 103 in step 319. That is, the target eNB 102b notifies the MME 103 of a handover. The MME 103 then transmits an update bearer request message to the SGW 104 in step 321. That is, the MME 103 notifies the SGW 104 of a handover. The MME 103 may transmit an End Marker Generation Indicator (EMGI) via the update bearer request message to the SWG 104. That is, the MME 103 requests an end marker.

The SGW 104 then transmits an update bearer response message to the MME 103 in step 323. In response to the update bearer request message, the SGW 104 performs switching of its data transmission path and then gives notice that the data transmission path is switched. Alternatively, if the update bearer request message contains the EMGI, the SGW 104 performs the switching of its data transmission path and then gives notice that the data transmission path is switched. The SGW 104 then generates an end marker, adds the end marker to the end of the source data, and then transmits the source data to the target eNB 102b via the source eNB 102a in step 325.

The target eNB 102b downloads the target data via a target data transmission path in step 327. The target data transmission path is established among the PGW 105, the SGW 104 and the target eNB 102b. The target eNB 102b transmits the target data, classified into the source data by the end marker, to the UE 101. That is, the target eNB 102b transmits the target data to the UE 101, immediately following the end of the source data.

The MME 103 transmits a path switch request acknowledgement message to the target eNB 102b in step 329. That is, the MME 103 notifies the target eNB 102b of the switching of the data transmission path. The target eNB 102b transmits a resource release message to the source eNB 102a in step 331. That is, the target eNB 102b requests to release the resource of the UE 101 from the source eNB 102a.

Although an exemplary embodiment of the present invention is implemented in such a way that the source SGW is identical to the target SGW, it should be understood that that present invention is not limited thereto. For example, the present invention may be modified in such a way that the source SGW and the target SGW are different from each other. The modification is illustrated in FIG. 4.

Figure 4:
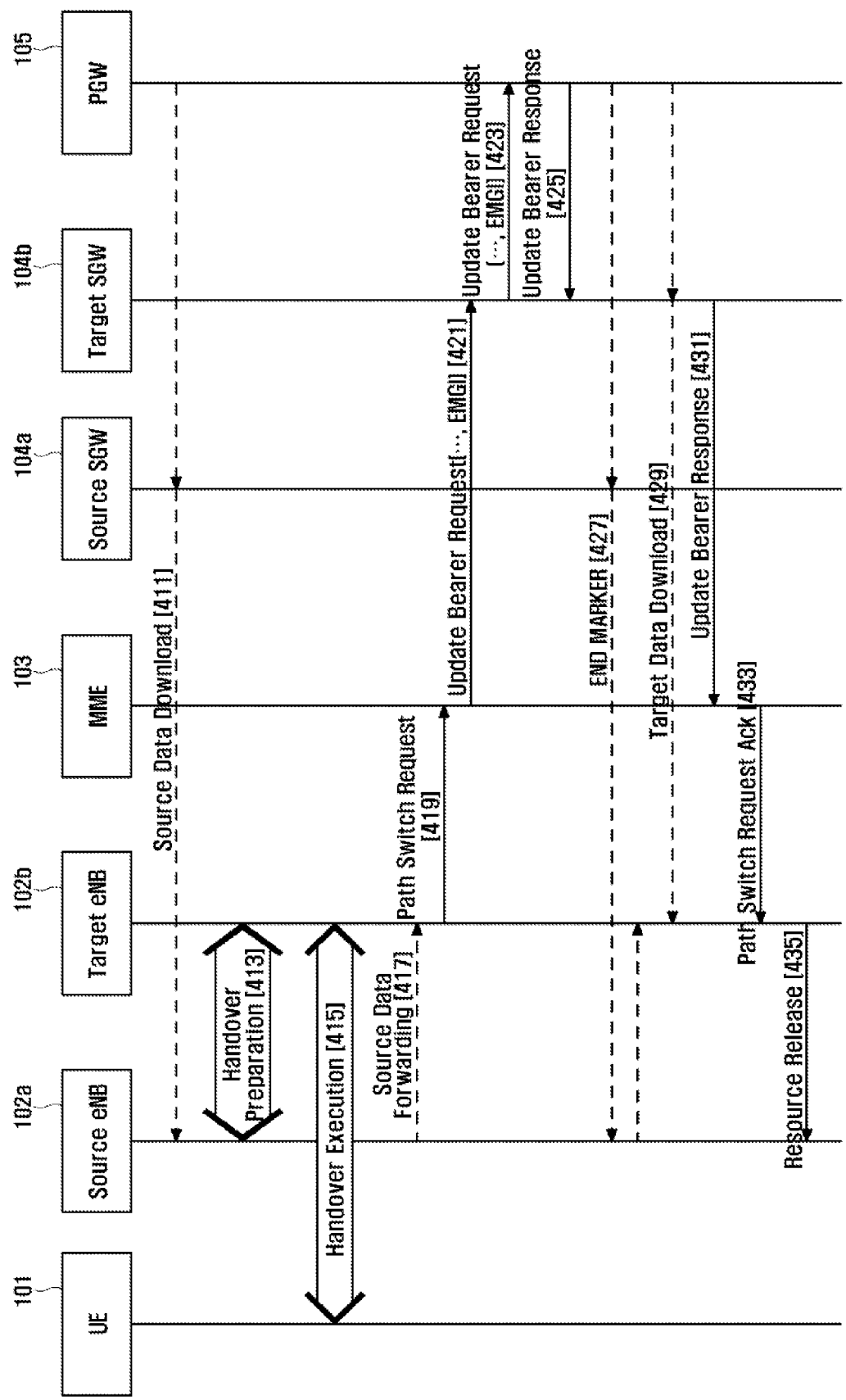
FIG. 4 is a signal flowchart of a data transmission method according to an exemplary embodiment of the present invention.

FIG. 4 is a signal flowchart of a data transmission method according to an exemplary embodiment of the present invention. In an exemplary implementation, it is assumed that a handover between a source eNB and a target eNB is performed via an X2 interface. It is also assumed that a PGW is communicated with a source SGW and a target SGW via a GTP.

Referring to FIG. 4, a data transmission procedure starts as a source eNB 102a downloads source data via a source data transmission path in step 411. The source data transmission path connects the PGW 105, the source SGW 104a and the source eNB 102a. The source eNB 102a may transmit a portion of the source data to a UE 101. When a handover of the UE 101 is needed during the download of the source data, the source eNB 102a and the target eNB 102b prepare a handover in step 413. The UE 101 carries out the handover from the source eNB 102a to the target eNB 102b in step 415. The source eNB 102a forwards the source data to the target eNB 102b in step 417. In that case, the target eNB 102b transmits the source data to the user equipment 101.

The target eNB 102b then transmits a path switch request message to an MME 103 in step 419. That is, the target eNB 102b notifies the MME 103 of a handover. The MME 103 then transmits an update bearer request message to a target SGW 104b in step 421. That is, the MME 103 notifies the target SGW 104b of a handover. The MME 103 may transmit an EMGI via the update bearer request message to the target SWG 104b. That is, the MME 103 requests an end marker. The target SGW 104b transmits the update bearer request message to the PGW 105 in step 423. That target SGW 104b also transmits the EMGI to the PGW 105.

The PGW 105 then transmits an update bearer response message to the target SGW 104b in step 425. In response to the update bearer request message, the PGW 105 performs switching of its data transmission path and then gives notice that the data transmission path is switched. The PGW 105 generates an end marker, adds the end marker to the end of the source data, and then transmits the source data to the target eNB 102b via the source SGW 104a and the source eNB 102a in step 427. If the update bearer request message contains the EMGI, the PGW 105 generates an end marker.

The target eNB 102b downloads the target data via a target data transmission path in step 429. The target data transmission path is established among the PGW 105, the target SGW 104b and the target eNB 102b. The target eNB 102b transmits the target data, classified into the source data by the end marker, to the UE 101. That is, the target eNB 102b transmits the target data to the user UE 101, immediately following the end of the source data.

The target SGW 104b transmits an update bearer response message to the MME 103 in step 431. The MME 103 transmits a path switch request acknowledgement message to the target eNB 102b in step 433. That is, the MME 103 notifies the target eNB 102b of the switching of the data transmission path. The target eNB 102b transmits a resource release message to the source eNB 102a in step 435. That is, the target eNB 102b requests to release the resource of the UE 101 from the source eNB 102a.

Although an exemplary embodiment of the present invention is implemented in such a way that a handover between the source eNB and the target eNB is performed via the X2 interface, it should be understood that the present invention is not limited thereto. For example, the present invention may be modified in such a way that a handover is performed among the source eNB, the target eNB, and the MME via the S1 interface. That is, communication between the source eNB and the target eNB may be indirectly established via the source SGW and the target SGW. The modification is illustrated in FIG. 5.

Figure 5:
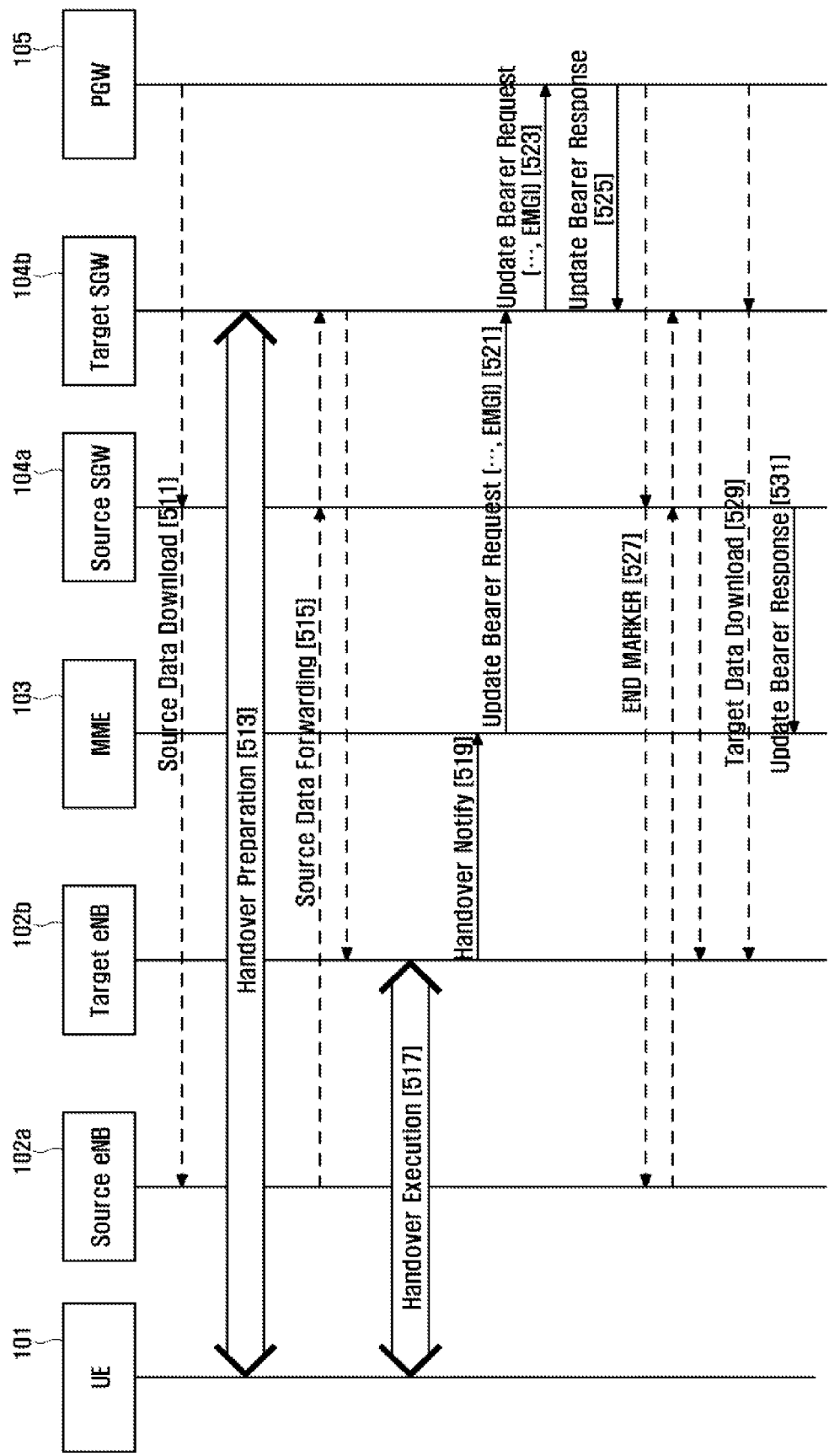
FIG. 5 is a signal flowchart of a data transmission method according to an exemplary embodiment of the present invention.

FIG. 5 is a signal flowchart of a data transmission method according to an exemplary embodiment of the present invention. In an exemplary implementation, it is assumed that a source SGW and a target SGW differ from each other. It is also assumed that a PGW is communicated with the source SGW and the target SGW via a GTP.

Referring to FIG. 5, a data transmission procedure starts as a source eNB 102a downloads source data via a source data transmission path in step 511. The source data transmission path connects the PGW 105, the source SGW 104a and the source eNB 102a. The source eNB 102a may transmit a portion of the source data to the UE 101. When a handover of the UE 101 is needed during the download of the source data, the source eNB 102a and the target eNB 102b prepare a handover in step 513. The source eNB 102a forwards the source data to the target eNB 102b in step 515. The source eNB 102a forwards a remaining portion of the source data to the target eNB 102b via the source SGW 104a and the target SGW 104b. The UE 101 executes a handover from the source eNB 102a to the target eNB 102b in step 517. In that case, the target eNB 102b transmits the source data to the UE 101.

After a handover has been completed, the target eNB 102b notifies the MME 103 of a handover notification message in step 519. The MME 103 transmits an update bearer request message to the target SGW 104b in step 521. That is, the MME 103 notifies the target SGW 104b of the handover. The MME 103 also transmits an EMGI to the target SGW 104b via the update bearer request message. That is, the MME 103 requests an end marker from the target SGW 104b. The target SGW 104b transmits the update bearer request message to the PGW 105 in step 523. The target SGW 104b also transmits the EMGI to the PGW 105.

The PGW 105 then transmits an update bearer response message to the target SGW 104b in step 525. In response to the update bearer request message, the PGW 105 performs switching of its data transmission path and then gives notice that the data transmission path is switched. The PGW 105 generates an end marker, adds the end marker to the end of the source data, and then transmits the source data to the target eNB 102b in step 527. If the update bearer request message contains an EMGI, the PGW 105 generates an end marker. The PGW 105 adds the end marker to the end of the source data and then transmits the source data to the target eNB 102b via the source SGW 104a, the source eNB 102a and the target SGW 104b.

The target eNB 102b downloads the target data via a target data transmission path in step 529. The target data transmission path is established among the PGW 105, the target SGW 104b and the target eNB 102b. The target eNB 102b transmits the target data, classified into the source data by the end marker, to the UE 101. That is, the target eNB 102b transmits the target data to the UE 101, immediately following the end of the source data.

The target SGW 104b transmits an update bearer response message to the MME 103 in step 531.

Although an exemplary embodiment of the present invention is implemented in such a way that the source SGW differs from the target SGW, it should be understood that the present invention is not limited thereto. For example, the present invention may be modified in such a way that the source SGW and the target SGW are identical to each other. In an exemplary implementation, although a handover is performed via an S1 interface and thus communication between the source eNB and the target eNB is indirectly performed, it should be understood that the present invention is not limited thereto. For example, it is possible to perform direct communication between the source eNB and the target eNB.

In an exemplary embodiment of the present invention, although the PGW generates an end marker and transmits the end marker thereto, it should be understood that the present invention is not limited thereto. For example, the present invention may be modified in such a way that the SGW may generate and transmit an end marker according to an instruction of the PGW. The modification is illustrated in FIG. 6.

FIG. 6 is a signal flowchart of a data transmission method according to an exemplary embodiment of the present invention. In an exemplary embodiment of the present invention, it is assumed that a source SGW and a target SGW differ from each other. It is also assumed that a handover between a source eNB and a target eNB is performed via an X2 interface. It is also assumed that a PGW is communicated with the source SGW and the target SGW via a Proxy Mobile Internet Protocol (PMIP).

Referring to FIG. 6, a data transmission procedure starts as the source eNB 102a downloads source data via a source data transmission path in step 611. The source data transmission path connects the PGW 105, the source SGW 104a and the source eNB 102a. The source eNB 102a may transmit a portion of the source data to the UE 101. When a handover of the UE 101 is needed during the download of the source data, the source eNB 102a and the target eNB 102b prepare a handover in step 613. The UE 101 then carries out the handover from the source eNB 102a to the target eNB 102b in step 615. The source eNB 102a forwards the source data to the target eNB 102b in step 617. In that case, the target eNB 102b transmits the source data to the UE 101.

The target eNB 102b then transmits a path switch request message to an MME 103 in step 619. That is, the target eNB 102b notifies the MME 103 of a handover. The MME 103 then transmits an update bearer request message to a target SGW 104b in step 621. That is, the MME 103 notifies the target SGW 104b of a handover. The MME 103 may transmit an EMGI via the update bearer request message to the target SWG 104b. That is, the MME 103 requests an end marker. The target SGW 104b transmits a proxy binding update message to the PGW 105 in step 623. That is, the target SGW 104b notifies the PGW 105 of a handover. That target SGW 104b also transmits the EMGI to the PGW 105.

The PGW 105 transmits a proxy binding update acknowledgement message to the target SGW 104b in step 625. In response to the proxy binding update message, the PGW 105 performs switching of its data transmission path and then gives notice that the data transmission path is switched. The PGW 105 transmits a binding revocation indicator message to the source SGW 104a in step 627. The PGW 105 also transmits the EMGI thereto. The source SGW 104a transmits a binding revocation acknowledgement message to the PGW 105 in step 629. The source SGW 104a generates an end marker, adds the end marker to the end of the source data, and then transmits the source data to the target eNB 102b via the source eNB 102a in step 631. If the binding revocation indicator message contains the EMGI, the source SGW 104a generates an end marker.

The target eNB 102b downloads the target data via a target data transmission path in step 633. The target data transmission path is established among the PGW 105, the target SGW 104b and the target eNB 102b. The target eNB 102b transmits the target data, classified into the source data by the end marker, to the UE 101. That is, the target eNB 102b transmits the target data to the UE 101, immediately following the end of the source data.

The target SGW 104b transmits an update bearer response message to the MME 103 in step 635. The MME 103 transmits a path switch request acknowledgement message to the target eNB 102b in step 637. That is, the MME 103 notifies the target eNB 102b of the switching of the data transmission path. The target eNB 102b transmits a resource release message to the source eNB 102a in step 639. That is, the target eNB 102b requests to release the resource of the UE 101 from the source eNB 102a.

Although an exemplary embodiment of the present invention is implemented in such a way that a handover between the source eNB and the target eNB is carried out via the X2 interface, it should be understood that the present invention is not limited thereto. For example, the present invention may be modified in such a way that a handover is performed among the source eNB, the target eNB, and the MME via an S1 interface. In that case, the handover may be carried out via indirect communication that is performed between the source eNB and the target eNB via the SGW. In an exemplary implementation, although the source SGW and the target SGW differ from each other, it should be understood that the present invention is not limited thereto. For example, the present invention may be modified in such a way that the source SGW is identical to the target SGW.

As described above, if the source SGW is identical to the target SGW when user equipment performs the handover from the source eNB to a target eNB, the SGW switches the data transmission path from the source eNB to the target eNB. The SGW then adds an end marker to the end of the source data and then transmits the source data to the target eNB via the source eNB. Alternatively, if the source SGW differs from the target SGW when user equipment performs the handover from the source eNB to a target eNB, the PGW switches the data transmission path from the source SGW and the source eNB to the target SGW and the target eNB. The PGW then adds an end marker to the end of the source data and then transmits the source data to the target eNB via the source eNB.

The target eNB transmits the source data to the UE. The target eNB transmits the target data, classified into the source by the end marker, to the UE. That is, the target eNB transmits the target data to the UE, immediately following the end of the source data.

When a handover of the UE is carried out from the source eNB to the target eNB, data may be efficiently transmitted to the UE. That is, although the target eNB receives the source data and the target data separately, where the target data immediately follows the source data, the target eNB may detect the boundary between the source data and the target data through the end marker. The target eNB then successively transmits the source data and the target data following the end of the source data to the UE. Therefore, the communication system and data transmission method, according to an exemplary embodiment of the present invention, may easily determine the transmission order of the source data and the target data. That is, the communication system can correctly detect the time point to transmit the target data in the target eNB.

As described above, exemplary embodiments of the present invention provide a communication system and data transmission method thereof that may efficiently transmit data to a UE when a handover of the UE is carried out from a source eNB to a target eNB. That is, although the target eNB separately receives the source data and target data, which are adjacent to each other, the target eNB may identify the boundary between the source data and the target data through an end marker, and then transmit the source data and the target data that follows the source data to the UE. Therefore, the target eNB may easily determine the transmission order between the source data and the target data. That is, the target eNB may precisely identify the time point to transmit target data.

While the present invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A data transmission method at a target evolved Node B (eNB), the method comprising:
   receiving an end marker added source data and the end marker from a source eNB, when a handover is carried out from the source eNB to the target eNB, wherein the end marker is generated by one of a Packet data network Gate Way (PGW) and a source Serving Gateway (SGW) according to whether the source SGW differs from a target SGW;
   receiving a target data immediately following the source data from the PGW; and
   transmitting the target data, which is classified into the source data by the end marker and immediately follows the end of the source data to user equipment,
   wherein the end marker is generated by the PGW when the source SGW differs from the target SGW,
   wherein the end marker is generated by the source SGW when the source SGW is the same as the target SGW, and
   wherein the source SGW transmits the source data from the PGW to the source eNB and the target SGW transmits the target data to the target eNB.

2. The method of claim 1, wherein the PGW communicates with the source SGW and the target SGW via at least one of a General Packet Radio Service (GPRS) Tunneling Protocol (GTP) and a Proxy Mobile Internet Protocol (PMIP).

3. The method of claim 1, wherein the end marker is transmitted to the source eNB by the PGW through the source SGW.

4. The method of claim 1, wherein the end marker is generated by the source SGW according to an indication of the PGW, when the source SGW is the same as the target SGW.

5. The method of claim 1, wherein the source data and the end marker is received from the source eNB via the source SGW and the target SGW.

6. The method of claim 1, further comprising receiving the source data via the source eNB, if the source Serving GateWay (SGW) is identical to the target SGW.

7. The method of claim 6, wherein the PGW communicates with the source SGW and the target SGW via at least one of a General Packet Radio Service (GPRS) Tunneling Protocol (GTP) and a Proxy Mobile Internet Protocol (PMIP).

8. A data transmission apparatus at a target evolved Node B (eNB), the apparatus comprising:
   a controller for, receiving an end marker added source data and the end marker from a source eNB, when a handover is carried out from the source eNB to the target eNB, wherein the end marker is generated by one of a Packet data network Gate Way (PGW) and a source Serving Gateway (SGW) according to whether the source SGW differs from a target SGW, receiving a target data immediately following the source data from the PGW, and transmitting the target data, which is classified into the source data by the end marker and immediately follows the end of the source data to user equipment,
   wherein the end marker is generated by the PGW when the source SGW differs from the target SGW,
   wherein the end marker is generated by the source SGW when the source SGW is the same as the target SGW, and
   wherein the source SGW transmits the source data from the PGW to the source eNB and the target SGW transmits the target data to the target eNB.

9. The apparatus of claim 8 wherein the PGW communicates with the source SGW and the target SGW via at least one of a General Packet Radio Service (GPRS) Tunneling Protocol (GTP) and a Proxy Mobile Internet Protocol (PMIP).

10. The apparatus of claim 8, wherein the end marker is transmitted to the source eNB by the PGW through the source SGW.

11. The apparatus of claim 8, wherein the end marker is generated by the source SGW according to an indication of the PGW, when the source SGW is the same as the target SGW.

12. The apparatus of claim 8, wherein the source data and the end marker is received from the source eNB via the source SGW and the target SGW.

13. The apparatus of claim 8, wherein the controller receives the source data via the source eNB, if the source Serving GateWay (SGW) is identical to the target SGW.

14. The apparatus of claim 13, wherein the PGW communicates with the source SGW and the target SGW via at least one of a General Packet Radio Service (GPRS) Tunneling Protocol (GTP) and a Proxy Mobile Internet Protocol (PMIP).

* * * * *